March 27, 1956 — A. P. LIEN ET AL — 2,739,992
EXTRACTION OF ETHYLBENZENE FROM NAPHTHAS WITH HF-AgF
Filed Nov. 20, 1951 — 2 Sheets-Sheet 1

Fig. 1

INVENTORS:
Arthur P. Lien
David A. McCaulay
BY Michael Dufinec
ATTORNEY

March 27, 1956     A. P. LIEN ET AL     2,739,992
EXTRACTION OF ETHYLBENZENE FROM NAPHTHAS WITH HF-AgF
Filed Nov. 20, 1951     2 Sheets-Sheet 2

Fig. 2

INVENTORS:
Arthur P. Lien
David A. McCaulay
BY Michael Dufinecy
ATTORNEY

United States Patent Office 2,739,992
Patented Mar. 27, 1956

2,739,992

EXTRACTION OF ETHYLBENZENE FROM NAPHTHAS WITH HF-AgF

Arthur P. Lien, Highland, Ind., and David A. McCaulay, Chicago, Ill., assignors to Standard Oil Company, Chicago, Ill., a corporation of Indiana Application November 20, 1951, Serial No. 257,357

6 Claims. (Cl. 260—674)

This invention relates to the extraction of ethylbenzene from a naphtha containing non-aromatic hydrocarbons and $C_8$ aromatic hydrocarbons. More particularly, the invention relates to the recovery of ethylbenzene and mixed xylenes from a narrow boiling range petroleum naphtha. Still more particularly, the invention relates to the separation of a mixture of $C_8$ aromatics into a high purity ethylbenzene fraction and a high purity xylene fraction.

Ethylbenzene has considerable commercial importance as the raw material for styrene manufacture. Ortho and para-xylene have become important commercially as raw materials for the manufacture of certain synthetic resins. At present ethylbenzene is produced commercially by the alkylation of benzene. Ethylbenzene and xylenes occur naturally in most hydrocarbon mixtures; a particularly good source of these $C_8$ aromatics is the naphtha derived from the catalytic treatment of a virgin petroleum naphtha. In nature, ethylbenzene and the isomeric xylenes are always found together. Because of the very slight difference in boiling point between ethylbenzene and the xylenes, it is extremely difficult to separate the mixture into high purity fractions by fractional distillation. The preferred method for the physical separation of the isomers in a substantially pure mixed $C_8$ aromatic hydrocarbon is by fractional crystallization. A very recently introduced procedure for obtaining a substantially ethylbenzene-free xylene mixture consists in treating a mixed $C_8$ aromatic with $BF_3$ in the presence of liquid HF. The $BF_3$ catalyzes the disproportionation of the ethylbenzene into diethylbenzene and benzene; these materials are readily separable by distillation from the isomeric xylenes. Thus the xylene product is obtained at the expense of ethylbenzene recovery.

It is an object of our invention to recover ethylbenzene and xylenes from a naphtha which contains these aromatics in addition to non-aromatic hydrocarbons. Another object is to separate a mixture of $C_8$ aromatic hydrocarbons into a high purity ethylbenzene fraction and a high purity mixed xylene fraction. Still another object is to separate ethylbenzene as such from a narrow boiling-range naphtha containing $C_8$ aromatics by a liquid-liquid extraction operation.

We have discovered that benzene, toluene, xylene, ethylbenzene, other polyalkyl benzenes and polynuclear aromatics can be extracted from the non-aromatic constituents of a petroleum naphtha which boils below about 450° F., and preferably below about 325° F. This separation is made by contacting said naphtha with a treating agent consisting of substantially anhydrous liquid HF and silver fluoride. Excellent recoveries of aromatics can be made by using at least about one-third mol of AgF per mol of aromatic hydrocarbon in said naphtha; and essentially complete extraction of the aromatics can be obtained by using at least about 0.4 mol, and preferably 0.8 mol, to about 1.5 mols of AgF per mol of aromatic in said naphtha. The amount of AgF needed is somewhat dependent on the specific aromatics being extracted. Sufficient liquid HF must be used to participate in the formation of a complex between the AgF and the aromatic hydrocarbon and to dissolve the resultant complex. The liquid HF used in the treatment should be between about 10 and 1500 volume percent based on aromatics in said naphtha, and desirably between about 75 and 600 volume percent. Selectivity of aromatic separation is facilitated by the use of large amounts of AgF. Thus when using about 0.8 or more mol of AgF, we prefer to use between about 75 and 300 volume percent of liquid HF. The temperature of contacting should be below about 250° F. and preferably should be at ambient temperature, i. e., between about 30 and 100° F. The extract phase from the contacting step is readily decomposed by being heated above the boiling point of liquid HF until all the HF has been distilled. The extract hydrocarbons are easily separated from the solid AgF remaining after the removal of the HF. High purity benzene, toluene and mixed $C_8$ aromatics are easily obtained by simple fractional distillation of the extract when the feed to our process is a naphtha boiling below about 325° F., when said naphtha contains less than about 0.02 wt. percent of sulfur and is substantially free of phenolic compounds. The above described process is the subject matter of our application S. N. 251,692, filed October 17, 1951, and entitled "Extraction of Aromatics from Naphthas," now Patent No. 2,713,552.

The above described discovery showed not only that all of the low boiling aromatics form complexes with AgF in the presence of liquid HF but also that no undesirable reactions such as disproportionation or isomerization took place at the temperatures normally used for the treatment. In addition to the above, this work indicated that there was no separation selectivity between the various aromatic compounds under the conditions of operation used.

We have discovered that ethylbenzene and xylene form complexes with AgF in the presence of liquid HF, which complexes have different dissociation constants. By virtue of this difference in dissociation constants, it is possible to separate a mixture of xylenes and ethylbenzene into a substantially pure ethylbenzene fraction and a substantially pure xylene fraction; or by varying the conditions of treatment, fractions of substantially any desired composition can be obtained. Briefly, we have discovered that it is possible to obtain a raffinate phase and an extract phase by treating a mixture of $C_8$ aromatics with sufficient liquid HF and some AgF in an amount less than about 0.4 mol of AgF per mol of $C_8$ aromatic, which raffinate phase contains a higher percentage of ethylbenzene relative to xylene than the feed mixture, and which extract phase contains a higher percentage of xylene relative to ethylbenzene than said feed mixture.

The problem of separating two difficultly separable liquids has been extensively examined in recent years. A particularly good exposition has been made by Colburn and Schoenborn in Trans. Amer. Inst. Chem. Engrs., 41, 421–443, 645 (1935). The difficulty of separation of two liquids is measured by relative volatility, for vapor-liquid systems, and relative distribution ratio, for liquid-liquid systems.

$$\alpha = \frac{y_1/y_2}{x_1/x_2}$$

where, $\alpha$=relative volatility or relative distribution ratio, $y_1$ and $y_2$=mol fraction of the two components in one phase, and $x_1$ and $x_2$=mol fraction of the two components in the other phase. Colburn gives an approximate method of calculating the number of theoretical stages needed to obtain 99% purity fractions at a practical reflux ratio, $$N_p = 18.4/\alpha - 1$$

Normally, a $C_8$ aromatic mixture contains ethylbenzene, o-xylene, m-xylene and p-xylene. These boil within a very narrow range, as shown by the values given by "National Bureau of Standards—C461—November 1947—p. 67."

|  | B. P., °F. | F. P., °F. |
| --- | --- | --- |
| ortho-xylene | 291.95 | −13.32 |
| meta-xylene | 282.38 | −54.17 |
| para-xylene | 281.03 | +55.87 |
| ethylbenzene | 277.14 | −138.96 |

The boiling point spread of 9.5° F. between ortho-xylene and meta-xylene permits separation by super fractional distillation without the use of a prohibitive number of theoretical plates. Ethylbenzene, p-xylene and m-xylene are considered to be inseparable by fractional distillation. The relative volatility for ethylbenzene and p-xylene is about 1.05, which means that about 370 theoretical plates are necessary for separation by fractional distillation.

The degree of separation that is attainable in a single liquid-liquid contacting stage between ethylbenzene and para-xylene by our process is illustrated by several experimental runs. In all cases the contacting was carried out in a carbon steel reactor equipped with a 1725 R. P. M. stirrer. One-sixth mol of solid AgF per mol of total aromatic in the feed was added to the reactor. In three runs, the same volume percent of liquid HF, based on total aromatics in the feed, was added to the reactor after the AgF addition; the amount of liquid HF was different in two runs in order to determine the effect of this variation on the degree of separation. Lastly the feed was added; in all cases the feed consisted of 60 volume percent of heptane and 40 volume percent of an ethylbenezene, para-xylene mixture. The contents of the reactor were agitated for one hour at a temperature of 68° F. After a two hour settling period, the two phases in the reactor were withdrawn separately. The raffinite phase was washed with dilute aqueous caustic to remove HF. The extract phase was decomposed with cold water; the oil layer was decanted from the aqueous layer and then washed with dilute aqueous caustic to remove HF. The aromatics were recovered from the raffinate and the extract by fractional distillation. The aromatic fractions were analyzed by ultraviolet absorption. Within the limits of analytical determination, no disproportionation of the ethylbenzene or isomerization of the p-xylene was found. The results of these runs are given below.

| Run | HF | Feed | | Raffinate | | Extract | | α |
| --- | --- | --- | --- | --- | --- | --- | --- | --- |
|  |  | E. B. | p-X | E. B. | p-X | E. B. | p-X |  |
| 1 | 300 | 30 | 10 | 20.8 | 5.7 | 70.4 | 25.7 | 1.34 |
| 2 | 300 | 20 | 20 | 14.0 | 12.2 | 41.7 | 50.6 | 1.39 |
| 3 | 300 | 10 | 30 | 7.9 | 17.7 | 23.9 | 72.6 | 1.36 |
| 4 | 50 | 20 | 20 | 14.2 | 11.8 | 45.4 | 48.4 | 1.28 |
| 5 | 20 | 20 | 20 | 14.1 | 11.3 | 42.3 | 40.9 | 1.21 |

The average relative distribution ratio (α) for runs 1, 2 and 3 is 1.36. Thus it is possible with our process to separate ethylbenezene and paraxylene into fractions of about 99% purity by the use of about 50 theoretical extraction stages. This represents a seven-fold improvement over superfractional distillation. High purity ethylbenzene, i. e., about 95%, can be readily obtained in more or less conventional size continuous countercurrent extraction towers.

The solubility of xylene and ethylbenezene in liquid HF at about 70° F. is about 2 volume percent. We have found that more aromatic hydrocarbon can be taken up by liquid HF when silver fluoride is dissolved therein than is capable of going into solution in liquid HF alone. This increase in solubility is due to the formation of a complex consisting of aromatic hydrocarbon, AgF and (we believe) HF. This complex is extremely soluble in liquid HF; it is possible to have more AgF present in a complex-liquid HF solution than liquid HF alone is capable of dissolving. This complex is stable in the presence of liquid HF at ambient temperature. The components of the complex can be recovered readily by distilling away the HF and aromatic hydrocarbon, whereupon the AgF remains behind in the vessel in the form of a very finely divided solid. Within the limits of possible experimental error we have found that 1 mol of AgF and 3 mols of xylene or ethylbenezene are present in each mol of complex; we believe that HF is a necessary constituent of the complex because no complex is formed in the absence of HF, but we do not know just how much HF is contained therein. In treating pure aromatic hydrocarbons, the amount of liquid HF present has some slight effect on the amount of AgF needed; however, in general, one-third mol of AgF per mol of pure aromatic hydrocarbon is just enough to result in complete solution of the aromatic hydrocarbon, i. e., no raffinate phase is present.

Silver fluoride is a crystalline solid with a melting point of 815° F. It is very soluble in liquid HF and passes into solution readily. The solubility at about 0° F. is 33 grams per 100 grams of HF or 0.26 mols of AgF per 100 ml. of liquid HF. The AgF may be recovered from its solution with liquid HF by vaporizing the HF.

We have found that when a mixture of aromatic hydrocarbons—such as, xylene and ethylbenzene—and non-aromatic hydrocarbons is treated with a solution of AgF in liquid HF, an upper raffinate phase and a lower extract phase are obtained. The upper raffinate phase consists of a very small amount of liquid HF and a mixture of hydrocarbons, which mixture contains a smaller percentage of aromatics than the feed mixture. The extract phase consists of liquid HF, complex, and physically dissolved aromatic and non-aromatic hydrocarbons; the extracted hydrocarbons recovered from the liquid HF-AgF treating agent consist predominantly of aromatics—usually the extracted hydrocarbons will contain substantially less than 20% of non-aromatic hydrocarbons.

The percentage recovery, in a single contacting stage, of the aromatic hydrocarbons present in the feed mixture is dependent upon the amount of AgF present in the treating agent. We have found that 70 to 75 volume percent of the aromatics in the feed can be readily extracted by using 1 mol of AgF for each 3 mols of aromatics to be recovered. The use of the theoretical amount of 1 mol of AgF for each 3 mols of aromatics in the feed mixture will not remove more than 80 to 85% of the total aromatics therein, in a single contacting stage. For example, with a feed mixture containing about 40% of xylenes in excess of 90% of the xylenes can be extracted by using 0.6 mols of AgF per mol of xylene in the feed. By using 1 mol of AgF per mol of xylene, it is possible to extract essentially all the xylenes from the feed in a single contacting stage.

To our surprise when we treated a mixture of pure ethylbenzene and pure xylene with an amount of AgF insufficient to dissolve all the aromatics into the liquid HF, the non-extracted aromatics (raffinate phase) had an ethylbenzene/xylene ratio higher than the ratio of the feed mixture; and the aromatic hydrocarbons in the extract phase had an ethylbenzene/xylene ratio lower than the ratio in the feed. Apparently, the AgF-xylene complex is more strongly associated than the AgF-ethylbenzene complex. The relative distribution ratio between ethylbenzene and xylene is more or less constant with AgF usage, i. e., from the presence of a trace amount of AgF to slightly less than the amount of AgF needed to bring all the aromatic into the liquid HF.

We have found that when a liquid HF solution of AgF-ethylbenzene complex and AgF-xylene complex (and even some excess AgF) is contacted with pure xylene in an amount large enough to form a raffinate phase, i. e., more xylene than is needed to complex the uncomplexed AgF, the raffinate phase will contain both ethylbenzene and xylene. The composition of the raffinate phase obtained in this manner is identical with that of a raffinate phase obtainable by treating an ethylbenzene-xylene mixture with liquid HF-AgF solution.

Usually in this specification, we refer to xylene as the other aromatic component of the ethylbenzene-containing feed to our process. By the term xylene, we mean any one of the xylene isomers or a mixture thereof. Similarly, when we refer to $C_8$ aromatics we mean a mixture of ethylbenezene and any one or more of the xylene isomers. We use the generic term xylene because we have found that, within the limits of experimental error, no separation can be made between the individual xylene isomers by our liquid HF-AgF treating agent.

The treatment of a feed consisting of ethylbenzene, xylene and non-aromatic hydrocarbons with liquid HF and some AgF will result in the formation of an extract phase and a raffinate phase. The raffinate phase contains some HF, most of the non-aromatics and some of the aromatics. The extract phase contains the treating agent, aromatics and some non-aromatics. The aromatics in the raffinate consist of ethylbenzene and xylene in the same relative ratio as would be calculated from the relative distribution ratio for the treatment of a pure aromatic mixture. Within the limits of experimental error, the relative distribution ratio does not appear to be affected by the presence of normal amounts of non-aromatic hydrocarbons.

When treating a mixture of $C_8$ aromatics and non-aromatics, the percentage of aromatics present in the raffinate depends principally on the amount of AgF used per mol of aromatic in the feed. When using as much as 1 mol of AgF, the aromatics in the raffinate may be less than one volume percent. In general, the usage of AgF should be less than about 0.6 mol in order to obtain a raffinate that contains an appreciable amount of aromatics. For maximum yield of ethylbenzene enriched raffinate, we prefer to use at least about one-third mol of AgF per mol of xylene present in the feed. A larger yield of raffinate can be obtained by using less AgF; however, in this case, the raffinate will contain a higher proportion of xylene. For a single contacting stage operation, the amount of ethylbenzene enrichment attainable is determined by the relative distribution ratio as well as the amount of AgF used; it is not possible to obtain high purity, i. e., about 95%, ethylbenzene admixture with xylene in a single contacting stage.

By the use of continuous countercurrent operation, either tower-type or batch stages, we can treat a feed stock containing ethyl-benzene and xylene, with liquid HF-AgF treating agent, and obtain a raffinate containing from substantially pure ethylbenzene to a percentage barely greater than the feed composition; and an extract containing from substantially pure xylene to a percentage barely greater than the feed composition. The purity of the product fractions is determined primarily by the number of stages used in the particular operation. Even though a single theoretical stage may need several feet of tower height, a high purity ethylbenzene fraction and a high purity xylene fraction can be obtained in a reasonably sized tower or by operating two or more towers in series.

With countercurrent operation in a given tower, the maximum yield of two high purity products is obtained by using about one-third mol of AgF per mol of xylene present in the feed to the tower. Using more AgF will decrease the yield of ethylbenzene-rich product, although not affecting purity, and will increase the yield of xylene product at the expense of the purity thereof. Using less AgF will increase the yield of ethylbenzene-rich product at the expense of purity, and will decrease the yield of the xylene rich product without affecting its purity. Thus for a given tower, some flexibility in operation can be obtained by varying the amount of AgF used per mol of xylene in the feed.

For a given yield and composition of products, a considerable saving can be made in number of theoretical stages by operating with reflux. A reflux stream of xylene is introduced near the bottom of the tower and passes up against the descending stream of treating agent and aromatics. Another reflux stream of liquid HF-AgF solution is introduced near the top of the tower; this stream contains enough AgF to balance the xylene reflux stream, i. e., one-third mol per mol of xylene in said xylene reflux. In this reflux method of operation, the feed is introduced near the vertical mid-point of the tower. The amount of xylene reflux may be between 1 and 30 volumes per volume of xylene-rich product.

Thus in countercurrent operation, without reflux, we can operate with from at least some AgF to as much as 0.6 mol per mol of aromatic in the feed. We prefer to operate with between about 0.25 and 0.40 mol of AgF per mol of xylene in the feed.

The complex that exists in the extract phase from the treatment of a mixture of $C_8$ aromatics and non-aromatic hydrocarbons with our liquid HF-AgF treating agent behaves like the complex formed by treating a pure aromatic with the treating agent. The complex is stable in the presence of liquid HF at the temperature of operations normally used in solvent extraction. Of course at temperatures above the boiling point of HF, it is necessary to apply superatmospheric pressure to the system in order to maintain the HF in the liquid state. The extracted hydrocarbons can be recovered from the extract phase by heating the extract phase and distilling the HF, whereupon the extract and solid AgF remain behind; the solid AgF and extract hydrocarbons are readily separable by decantation, filtration, centrifuging or by distilling the aromatics. The AgF recovered by this method may be reused in the process.

The extract hydrocarbons may also be recovered from the extract phase by treating said extract phase with water, whereupon the extract hydrocarbons appear as a separate phase which may be decanted from the lower aqueous layer. This latter method of separation is particularly well suited for laboratory operations.

We believe that the complex obtained by the treatment of a $C_8$ aromatic hydrocarbon with AgF in the presence of liquid HF contains three components, namely, for each mol of complex: 1 mol of AgF, 3 mols of aromatic hydrocarbon, and probably at least 1 mol of HF. Although the solubility of AgF in liquid HF is high, even the saturated solution is capable of providing enough HF to form the complex. It is necessary to have an excess of liquid HF present to dissolve the complex that has been formed and to permit its separation as a solution in the liquid HF from the non-aromatic hydrocarbons and the non-complexed aromatic hydrocarbons. This solution consists of liquid HF, the complex, aromatic hydrocarbons in simple solution and non-aromatic hydrocarbons apparently in simple solution; we mean this solution when we speak of the extract phase. We have found that phase separation can be obtained when a mixed hydrocarbon is contacted with our treating agent wherein the HF content is about 10 volume percent based on total aromatics in the mixed feed. Amounts of liquid HF up to 1500 volume percent based on aromatics in the mixed feed have been used; in general, better phase separation is obtained when using amounts in excess of 1 volume of liquid HF per volume of aromatics to be extracted.

Non-aromatic hydrocarbons are only very slightly soluble in liquid HF; they are somewhat more soluble in liquid HF containing the aromatic-AgF-HF complex. Apparently the complex solubilizes both aromatic hydrocarbons and non-aromatic hydrocarbons so that more of these hydrocarbons can be taken up by the liquid HF than would be predicted by the solubility of the hydrocarbons in pure liquid HF. However, this solubilizing effect at constant AgF level appears to be a function of the concentration of the complex in the liquid HF because, surprisingly enough, we have discovered that the amount of non-aromatic hydrocarbon present in the extract hydrocarbons is lower at large liquid HF usage than at small liquid HF usage. For example, at an AgF usage of 0.17 mol, 20% of liquid HF based on $C_8$ aromatics in the mixed feed produced a hydrocarbon extract containing 17% of non-aromatics (see run 5); and at 300% of liquid HF usage the extract hydrocarbons contained only 4% of non-aromatics (see run 1). The amount of non-aromatics present in the extract hydrocarbons at the same AgF concentration can be reduced to an ordinarily unobjectionable amount of about 2% in a single stage by using about 500% or more of liquid HF based on total aromatics in the mixed feed.

To our surprise, at constant temperature operation, the amount of liquid HF present also had a very marked effect on the relative distribution ratio—alpha. In run 2, using 300 volume percent of liquid HF based on aromatics, alpha was 1.39; in run 4, using 50% of HF, alpha was 1.28; and in run 5, using 20% of HF, alpha was 1.21. This decrease in alpha represents a decrease in degree of separation of 25% and 50%, respectively. Apparently, some slight beneficial effect is obtainable by using more than about 300% of liquid HF; for very high HF usage, alpha appears to approach a value of about 1.4.

When operating at the minimum HF usage of 10 volume percent, based on aromatics in the feed, only a little improvement in separation is obtainable by our process over superfractionation. At constant temperature operation, alpha increases very rapidly with increase in HF usage. We are able to obtain a markedly enhanced degree of separation when using about 100 volume percent of liquid HF; however, we prefer to operate at a liquid HF usage, based on aromatics in the feed, of at least about 200 volume percent. Although we can operate with as much as 1500 volume percent of liquid HF, we prefer to use less than about 600 volume percent, at which point the non-aromatic content of the extract is about the minimum point of 1–2%. When considering both alpha and non-aromatic content of the extract, the probable optimum HF usage is between about 250 and 500 volume percent, based on aromatics in the feed.

We prefer to use substantially anhydrous liquid HF, i. e., HF containing not more than about 1 or 2% of water.

In operations with a fixed amount of liquid HF at temperatures between about 30° and 130° F., the relative distribution ratio appears to be substantially constant at a value of between about 1.35 and 1.4. An experimental run at 122° F. gave an alpha of 1.40. At higher temperatures, alpha decreases and reaches a value of about 1.30 at 167° F. At a temperature of 250–300° F., HF catalyzes the isomerization and even cracking of the paraffins and naphthenes normally present in naphthas derived from petroleum sources. At temperatures below about 30° F., the increase in viscosity of the system tends to interfere with phase separation and the degree of separation of the aromatics. Although we can operate on a mixed feed at temperatures below about 250° F., we prefer to operate below 160° F. in order to maintain higher alpha values. In particular, we prefer to operate between about 50 and 120° F.

Sufficient pressure must be maintained on the contacting system to keep the HF in the liquid state at the particular temperature of operation. At 120° F., we operate at about 75 p. s. i. g.

For best results, i. e., the least number of extraction stages, the feed stock and the treating agent should be contacted for a time long enough to permit the maximum amount of separation at the particular conditions of liquid HF usage and operating temperature (alpha appears to be independent of AgF usage). The length of time needed in each stage will depend in large part on the efficiency of contacting. When operating at ambient temperatures, such as 30° F. to 120° F., prolonged contacting times are not harmful. In general, we have found that with efficient contacting, good results can be obtained at contact times between about 5 minutes and 1 hour in each extraction stage.

Organic-sulfur compounds, such as are normally present in most petroleum naphthas, form complexes with AgF in the presence of liquid HF. These complexes are more stable than the AgF-aromatic complexes and are more difficult to decompose. However, heating the complex to 400–500° F. will drive off HF and sulfur compounds and thus dissociate the complex. The AgF-sulfur compound complexes are solid materials somewhat similar in appearance to the asphaltic constituents of crude oil. These complexes tend to emulsify the extract phase into the raffinate phase, rendering a separation between the two phases difficult, and in some cases, virtually impossible by ordinary methods. (The solid material can be removed by precoat filtration or by centrifuging.) The larger the percent of sulfur present in the naphtha to be treated, the more likely it is that difficulty in separation will be encountered and the more difficult the separation will be in itself. Even when the sulfur compounds do not markedly interfere with the separation, a sludge-like material may be present in the extract phase (or even in the raffinate phase) which will interfere with the recovery of the aromatics. To illustrate, a virgin naphtha containing about 23% of toluene, ethylbenzene and xylenes and having a total sulfur content of 0.32 wt. percent, was contacted at about 70° F. with 400 volume percent of liquid HF and 1 mol of AgF per mol of aromatics. It was found impossible to withdraw the mixture from the reactor. When the reactor was opened, it was found to contain a pasty mass consisting of the naphtha, liquid HF and AgF. On the other hand, when a sample of the same virgin naphtha was desulfurized with liquid HF alone and the essentially sulfur-free naphtha contacted with liquid HF-AgF solvent as above, a clean separation between the raffinate and extract phases was obtained. In another experiment a synthetic mixture of normal heptane and xylenes was increased to a total sulfur content of 0.4 wt. percent by the addition of di-n-propyl sulfide; this feed stock was treated with liquid HF-AgF solvent and a fairly clean separation was obtained between the raffinate and the extract phases. However, the raffinate phase contained a considerable amount of finely dispersed particles of AgF-sulfide complex; this material was difficultly removable from the raffinate phase. In general, we prefer to operate on hydrocarbon mixtures which contain essentially no sulfur compounds—on the order of less than .02 wt. percent sulfur. Naphthas containing a sulfur content suitable for our process can be readily obtained by treating high sulfur naphthas with liquid HF or by hydrodesulfurization or by hydroforming or by any other process that removes sulfur without simultaneously removing appreciable quantities of the desired aromatics.

In general, olefins, in the amounts usually present in naphthas that would be desirable feed stocks to our process, do not interfere with separation of the extract phase from the raffinate phase. We have found that the aromatic compounds present are alkylated by the olefins in the feed stock to form alkylaromatics which complex with AgF and which are recovered in the extract phase along with the non-alkylated aromatics. These alkylated aromatics boil above xylenes and can be readily separated from xylenes by simple fractional distillation. No appreciable formation of alkylfluorides has been observed when treating olefin containing feed stock. Thus the disadvantage for operation on an olefin-containing feed stock is the loss of some of the more desirable aromatic compounds to higher boiling alkylaromatics. However, these alkylaromatics have high octane numbers and can be used as aviation safety fuel blending stocks; or they may be used as high solvency naphthas. If the olefin content is considered to be excessive, the naphtha may be treated to remove these. A process for such removal is given in U. S. 2,569,216.

The phenolic-type materials found in most naphthas derived from thermal or catalytic cracking react with AgF to form complexes which are detrimental to phase separation. Also, these materials increase the difficulty of obtaining pure compounds by simple fractional distillation from the aromatics recovered by our process. However, one or two washes with a concentrated sodium hydroxide solution will reduce these phenolic compounds to a level where no appreciable hindrance to phase separation will take place. Another method of removing these phenolic bodies is to treat the raw naphtha with liquid HF.

Our process may be applied to a mixture of hydrocarbons comprising $C_8$ aromatics, paraffins, naphthenes and olefins. A particularly suitable feed to our process is a petroleum naphtha boiling between about 245 to 300° F. Another excellent feed to our process is the xylene cut of light oil derived from the coking of coal. The feed stock to our process must be free from $H_2S$ and substantially free of organic sulfur compounds, particularly those found in virgin naphthas derived from high sulfur crudes, such as West Texas crude. We prefer that the feed stock contain less than about 0.02 wt. percent of sulfur. In general, we have found that a high sulfur naphtha which has been desulfurized by treatment with liquid HF is a satisfactory feed to our process.

The presence of olefins in the feed stock is undesirable because alkylation converts the $C_8$ aromatics to higher boiling alkylbenzenes and thereby decreases the yield of the lower boiling aromatics. The phenolic compounds present in thermally cracked naphthas and in the so-called catalytically cracked naphthas such as from the fluid catalytic cracking, Thermofor catalytic cracking, or Houdry cracking processes interfere with phase separation in our process. Phenolic body-containing cracked naphthas are a suitable feed to our process after treatment for the removal of these materials.

A particularly suitable feed for our process is the $C_8$ aromatic containing naphtha derived from the so-called hydroforming process, i. e., the vapor phase treatment of a virgin naphtha at 850–1050° F. in the presence of hydrogen over a catalyst such as molybdena on an alumina support or a platinum-containing catalyst. The hydroformate from such a process is low enough in sulfur to permit operation without further desulfurization and is so low in olefin content that very little of the ethylbenzene and xylene is degraded to higher boiling alkylaromatics by alkylation. The $C_8$ aromatics contained in such a cut may consist of between 10 and 40 volume percent of ethylbenzene and 90 to 60% xylene, depending on the process and the particular feed thereto.

Some crudes contain a high percentage of aromatic hydrocarbons and the virgin naphtha from such a crude is a good source of feed stock to our process. Bulletin 497, Bureau of Mines, entitled "Aviation Gasolines," reports several naphthas boiling between 242 and 285° F. which contain as much as 25% of $C_8$ aromatics. The percentage of ethylbenzene present in this narrow boiling naphtha will vary; in the case of a West Texas crude, about 40 volume percent of the $C_8$ aromatics present in a 245–300° F. virgin naphtha is ethylbenzene. This particular naphtha contains about 0.2 wt. percent sulfur and substantially no olefins or phenolic compounds.

Thus by suitable pretreatment to remove interfering materials we can charge to our process materials boiling between about 245 and 300° F. These materials can be derived from distillation of petroleum, from the thermal or catalytic cracking of naphthas from petroleum, from hydroforming or hydrodesulfurization of virgin or cracked naphthas, or they may consist of a mixture of aromatics, paraffinics, naphthenics and olefinics derived from any source.

We prefer to have a feed stock consisting of substantially pure $C_8$ aromatics. However, the usual feed stock to our process will contain 50 volume percent or more of non-aromatic material. Where aromatic contentrates are available from superfractionation equipment, feed stock containing 70 or 80% of $C_8$ aromatics may be available. We have found that when operating on feed stocks containing much in excess of 50% of aromatic hydrocarbons, it is desirable to add a diluent to the feed stock prior to the contacting step. The diluent should be a paraffinic and/or naphthenic hydrocarbon or a mixture of hydrocarbons low in materials that would interfere with phase separation; the diluent should be readily separable by simple fractional distillation from the individual aromatic hydrocarbons. We prefer to use as diluents paraffinic and naphthenic hydrocarbons of low boiling point since these materials are not isomerized or cracked by the liquid HF at the preferred operating temperatures. Suitable hydrocarbons are pentane, hexane, heptane, cyclohexane, methylcyclohexane, petroleum ether, etc. When operating at low temperatures such as 30° F., the diluents might be higher boiling paraffinic or naphthenic hydrocarbons containing 9, 10 or 11 carbon atoms. However, in general, the feed stocks to our process will not require the use of a diluent. We prefer to operate without a diluent or with a minimum amount of diluent, since the presence of high percentages of non-aromatic compounds requires the use of excessive amounts of HF in order to maintain a high aromatic selectivity of extraction.

The non-aromatic hydrocarbons extracted from the feed by the treating agent boil in about the same range as the aromatic hydrocarbons. Their presence decreases the purity of the aromatic hydrocarbons and they must be removed in order to obtain substantially pure aromatics as the final product. We have found that these non-aromatic hydrocarbons can be readily displaced from the extract phase by washing the extract phase with a diluent-type hydrocarbon such as pentane, hexane or a 9, 10 or 11 carbon atom hydrocarbon. A single stage washing operation is usually sufficient to reduce the non-aromatic content of the extract phase to a point where very high purity aromatics can be obtained by simple fractional distillation of the recovered aromatic hydrocarbons.

Two diagrammatic illustrations of large scale embodiments of our process are given herein.

Figure 1:
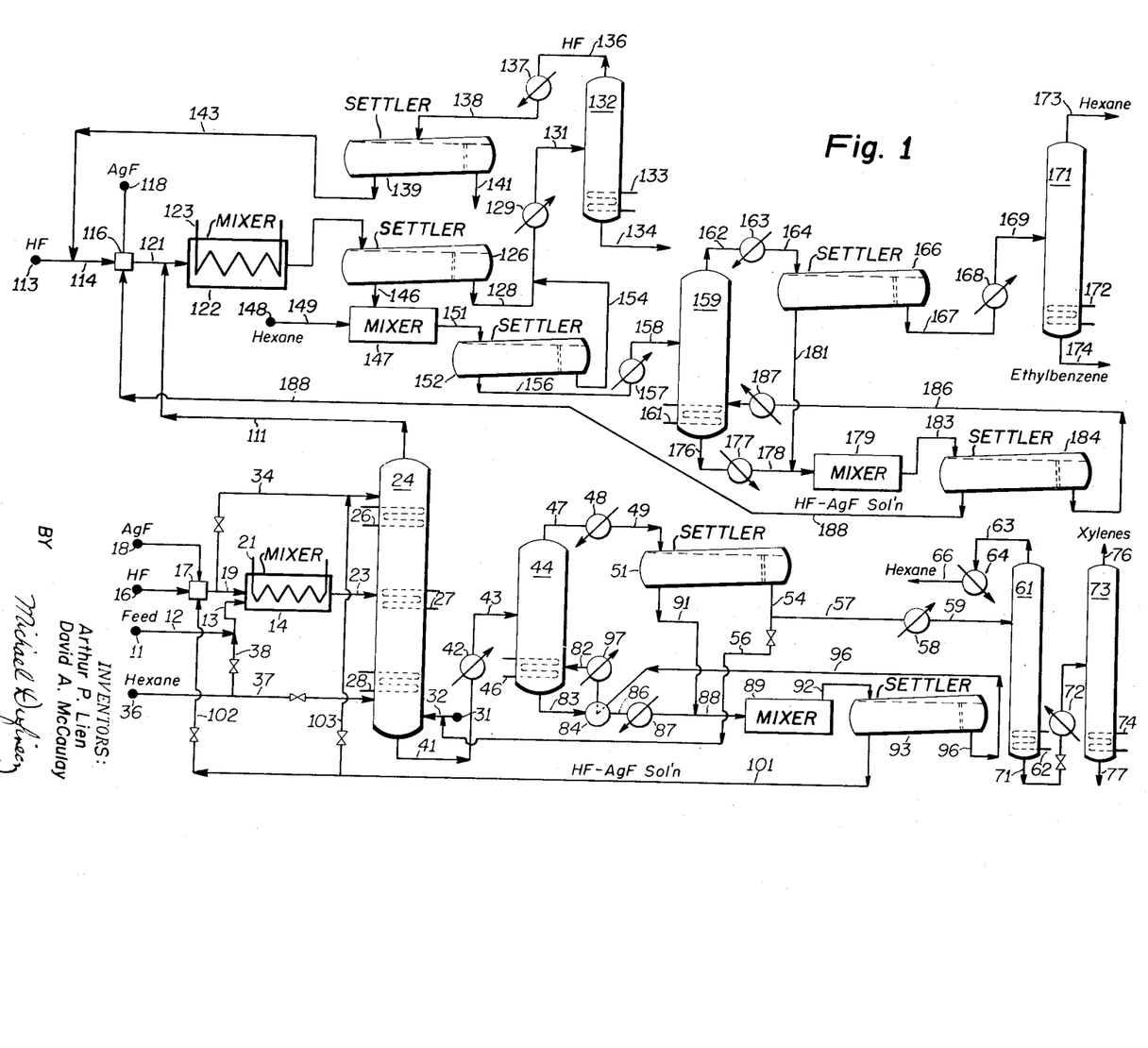
Figure 1 shows the recovery of ethylbenzene and xylene from a substantially sulfur-free, but olefin and non-aromatic containing feed stock.

The feed to the embodiment illustrated in Figure 1 consists of a narrow boiling hydroformate cut boiling between about 245° and 300° F., which contains $C_8$'s as the only aromatic constituents. The source of this cut is a hydroformate obtained by treating a West Texas virgin naphtha at about 950° F. over a molybdena-on-alumina catalyst in the presence of hydrogen. The feed stock has an unusually high ethylbenzene to xylene ratio; the $C_8$ aromatics consist of 40 volume percent ethylbenzene and 60% mixed xylenes. The feed stock contains 45 volume percent of aromatics, about 3% of olefins, about 52% of non-aromatics and about 0.01 wt. percent of sulfur.

The feed from source 11 passes through lines 12 and 13 into mixer 14. Liquid HF from source 16 passes into vessel 17. Silver fluoride from source 18 is passed into vessel 17 where it is dissolved by the liquid HF. In this illustration we wish to obtain the maximum yield of very high purity, that is, about 99%, of both ethylbenzene and xylene; in order to obtain this result, we use one-third mol of AgF per mol of xylene in the feed. The liquid HF usage is 300 volume percent, based on $C_8$ aromatics in the feed, in order to obtain a high relative distribution ratio.

The liquid HF-AgF treating agent passes from vessel 17 and through line 19 into mixer 14 where the feed stock and treating agent are thoroughly commingled. Mixer 14 is provided with a coil 21 which permits the temperature of its contents to be adjusted to between 50 and 120° F. From mixer 14, the mixed treating agent and feed pass by way of line 23 into continuous countercurrent extraction tower 24, at about the vertical midpoint thereof.

Extraction tower 24 may be a cylindrical vessel filled with HF-resistant packing, such as, Berl saddles, Raschig rings, shaped expanded metal sections, etc. We prefer to use a tower equipped with modified bubble trays. Tower 24 is provided with heat exchanger coils 26, 27 and 28 which serve to maintain the tower at the desired temperature; in this illustration we operate at 70° F. and under a pressure of 15 p. s. i. g., to ensure keeping the HF in the liquid phase. The separation we want requires about 40 to 50 theoretical extraction stages. In order to obtain reasonable tower heights, it may be desirable to use two or more towers in series, rather than the single tower shown herein.

In order to improve the efficiency of separation in tower 24, a reflux stream of xylene, from source 31, is introduced near the bottom of the tower by way of line 32. We use in this illustration a reflux/xylene product ratio of 10:1. Near the top of tower 24, we introduce another reflux stream of liquid HF-AgF treating agent; the amount of AgF in this stream is just enough to complex the xylenes introduced as reflux. The liquid HF-AgF reflux enters tower 24 by way of line 19 and valved line 34. When it is desirable to keep down the amount of liquid HF in the tower, the reflux stream may be a saturated solution of AgF in liquid HF, obtained from a source not shown.

The non-aromatics in the feed boil very close to the desired aromatic products. Some of these non-aromatics will be present in the extract phase unless removed therefrom. We have found that a simple washing with a diluent hydrocarbon that is easily separable by distillation from the aromatics will remove substantially all the close boiling non-aromatics and produce an extract phase containing diluent hydrocarbon as substantially the only non-aromatic hydrocarbon. In a tower extraction operation, this washing can be carried out by introducing the diluent hydrocarbon near the bottom of the tower. In this case we introduce into tower 24 about 5 volumes of hexane per volume of non-aromatics present in the extract phase from source 36 and valved line 37.

When the non-aromatic content of the feed is less than about 50%, we prefer to add a diluent hydrocarbon, such as hexane, to the feed prior to contacting the feed with the treating agent. In this embodiment, hexane can be passed from line 37 and valved line 38 into line 13.

From the bottom of extraction tower 24 the extract phase passes by way of line 41, heat exchanger 42 and line 43 into decomposer 44. The extract phase consists of liquid HF, complex and some hexane. Decomposer 44 is provided with an internal heater 46. The temperature in decomposer 44 is high enough to vaporize the HF, the aromatics and the hexane. When the HF is vaporized, the complex decomposes into liquid aromatic and finely divided solid AgF; a suitable temperature at the vapor outlet of decomposer 44 is 300° F. Decomposer 44 may be operated under either vacuum or pressure and the top temperature should be adjusted accordingly. The vapors from decomposer 44 pass out through line 47 through exchanger 48 and line 49 into settler 51. The vapors are condensed in exchanger 48 and separate in settler 51 into a hydrocarbon upper layer and a liquid HF lower layer.

The hydrocarbons pass out of settler 51 through line 54. A part of the hydrocarbons, which comprise mainly xylenes, is recycled to extraction tower 24 by way of valved line 56 and line 32. The other portion of the hydrocarbons is set by way of line 57, exchanger 58 and line 59 into distillation tower 61. Distillation tower 61 is operated at a tower top temperature just high enough to vaporize the hexane and the very slight amount of HF contained in the hydrocarbons from settler 51; at atmospheric pressure operation a suitable temperature is 175° F. An internal exchanger 62 maintains the tower at the proper bottoms temperature. The hexane and HF pass out of tower 61 through line 63 and are condensed by exchanger 64. The liquid hexane, which contains some HF, is sent by line 66 and other lines, not shown, back to the extraction operation in tower 24.

The aromatic hydrocarbons from the decomposed extract phase consist of the ortho, para and meta isomers of xylene, some ethylbenzene and some higher boiling alkyl aromatics resulting from the alkylation of C₈ aromatics with the olefins present in the feed stock. These aromatics pass from tower 61 through line 71 and exchanger 72 into distillation tower 73. Tower 73, equipped with reboiler 74, is provided with a sufficient number of distillation stages to permit the separation of the high purity xylene fraction from the higher boiling alkyl aromatics. This high purity xylene fraction passes out of the top of tower 73 through line 76 to storage not shown. The higher boiling alkyl aromatics pass out of tower 73 through line 77 to storage not shown. These aromatics can be used in aviation safety fuel or as high solvency naphthas.

From decomposer 44 the solid AgF is removed in the form of a slurry with a hydrocarbon higher boiling than ortho-xylene; for example, a suitable hydrocarbon is a mixture of $C_{12}$ paraffins boiling at about 375° F. We use about a gallon of hydrocarbon per pound of AgF present in the decomposer. This represents about a 1:8 ratio by weight of AgF to hydrocarbon. The slurry-forming hydrocarbons are introduced by way of line 82 into decomposer 44. The temperature of the slurry in the bottom of decomposer 44 must be greater than about 300° F. in order to maintain a proper temperature gradient in the decomposer. A slurry of AgF and hydrocarbons passes out of the decomposer through line 83 through heat exchanger 84, line 86, cooler 87 and line 88 into mixer 89. The slurry is cooled in cooler 87 to a temperature of about 70° F. in order to decrease isomerization or decomposition reactions of the hydrocarbon. Liquid HF from settler 51 is introduced into line 88 by way of line 91. In mixer 89 the liquid HF dissolves the AgF with the slurry. The liquid HF-AgF solution and the hydrocarbons pass from mixer 89 by way of line 92 into settler 93. From settler 93 the upper layer of paraffins is recycled to the decomposer through line 96, exchanger 84 and exchanger 97. The liquid HF-AgF solution is passed from settler 93 through line 101 and is recycled in part to vessel 17 by way of valved line 102; and in part to the reflux stream in tower 24 by way of valved line 103 and line 34.

A raffinate phase consisting of non-aromatics, hexane, ethylbenzene, a very minor amount of xylene and a minor amount of HF passes out of the top of tower 24 by way of line 111. In order to recover from the raffinate phase the aromatics contained therein, we treat the raffinate phase with an appropriate amount of liquid HF-AgF treating agent.

Liquid HF from source 113 is passed through line 114 into vessel 116. Here we use about 100 volume percent of liquid HF, based on aromatics in the raffinate phase from tower 24. AgF from source 118 is passed into vessel 116 where it is dissolved by the liquid HF. In order to recover substantially all of the aromatics in a single contacting stage, we use 1 mol of AgF per mol of aromatic in the raffinate phase from tower 24. The liquid HF-AgF treating agent from vessel 116 is passed into line 121 where it meets the raffinate phase in line 111, and the combined stream passes into mixer 122. Mixer 122 is provided with an exchanger 123 which heats the mixture to 80° F. A suitable contacting time in the mixer is about 10 minutes. From mixer 122 the mixture is passed by way of line 124 into settler 126. In settler 126 the mixture separates into an upper layer consisting of non-aromatics and a minor amount of HF and trace amounts of aromatics. This upper layer is passed from the settler by way of line 128, exchanger 129 and line 131 into stripper 132. Stripper 132 is provided with an internal heater 133 and some fractionating trays. The temperature in stripper 132 may be between about 200 and 400° F at a pressure great enough to prevent the non-aromatics from passing overhead. The substantially HF and hexane-free non-aromatics pass out of stripper 132 by way of line 134. These non-aromatic materials are mostly branched paraffins of high octane number and are useful as blending stocks for aviation fuel.

The overhead from stripper 132 consists of HF and hexane; these pass by way of line 136, cooler 137 and line 138 into settler 139. In settler 139 the hexane separates and is withdrawn through line 141; this material may be recycled to extraction tower 24 by a line not shown. The liquid HF from settler 139 is recycled to line 114 by way of line 143.

From settler 126 a lower layer consisting of liquid HF, complex, excess AgF and some non-aromatics is withdrawn by line 146 to mixer 147. Hexane, about 5 volumes per volume of non-aromatcs, from source 148 is passed by way of line 149 into mixer 147. From mixer 147 the mixture is passed via line 151 into settler 152. In settler 152 an upper layer consisting of hexane and extracted non-aromatics from the lower layer of settler 126 is withdrawn by way of line 154 and introduced into line 128.

The lower layer from settler 152 is passed through line 156, exchanger 157 and line 158 into decomposer 159. Decomposer 159 operates in the same manner as decomposer 44. The bottom temperature in decomposer 159 is maintained above the boiling point of ethylbenzene by internal heater 161. The HF, hexane and aromatics pass out of decomposer 159 through line 162, cooler 163 and line 164 into settler 166. From settler 166 the upper layer of hexane and aromatics is passed through line 167, exchanger 168 and line 169 into fractionator 171. The temperature in fractionator 171 is maintained by internal heater 172 high enough so that the hexane is removed overhead through line 173 to storage not shown. The bottom product from the fractionator 171 consists of very high purity ethylbenzene which contains only about 1% of xylenes. This ethylbenzene product is sent to storage not shown by way of 174.

The solid AgF resulting from the decomposition of the complex in decomposer 159 is slurried with a high boiling paraffin and this slurry is withdrawn from decomposer 159 through line 176, cooler 177 and line 178 into mixer 179. Liquid HF from settler 166 is introduced into line 178 from line 181. The liquid HF dissolves the AgF out of the slurry. The contents of mixer 179 are passed through line 183 into settler 184. The upper layer of high boiling paraffin is recycled to decomposer 159 by way of line 186 and heater 187. The lower layer in settler 184 is recycled to the extraction operation by way of line 188 and vessel 116.

By this method of operation we are able to recover substantially all the C₈ aromatics present in a substantially sulfur free feed stock containing olefins, aromatics and non-aromatics. These C₈ aromatics are recovered in the form of a very high purity ethylbenzene fraction and a very high purity mixed xylene fraction. We know of no other technique which will produce this result as easily as our process.

While our process is readily adapted to the treatment of C₈ aromatic-containing feed stock wherein the non-aromatics cannot be separated by distillation, we prefer to simplify the process by using substantially pure C₈ aromatics as the feed stock. Such a feed stock is obtainable from the distillation of light oil from the coking of coal or by the extractive distillation treatment of xylene cuts or by recovery of xylenes from the treatment of a naphtha boiling below about 450° F. with our liquid HF-AgF treating agent.

The process illustrated in Figure 1 is very readily adapted for operation on a substantially pure C₈ aromatic fraction. The feed will enter the system from source 11 and pass through lines 12 and 13 into mixer 14. Liquid HF-AgF treating agent in the same proportions as for treating a non-aromatic containing fraction contact this feed in mixer 14.

We prefer to dilute the pure aromatic feed with a diluent such as hexane. Satisfactory operating conditions call for the use of about 1 volume of hexane for each volume of the pure aromatic feed. Thus in this case 1 volume of hexane per volume of feed is passed from source 36 through line 37 and valved line 38 into line 13 where it meets the feed prior to passing into mixer 14.

Tower 24 will be operated on this feed very much like it would be on the mixed feed in the illustration above. The raffinate phase from tower 24 will consist of hexane, ethylbenzene, a very small amount of xylene and some HF. Since the hexane is easily separated from the aromatics by distillation, the raffinate phase is sent directly to line 167 by a line not shown.

The raffinate phase is heated in exchanger 168 and then passed through line 169 into fractionator 171. The hexane and HF are taken overhead from fractionator 171 by line 173 and are recycled to line 37 by a line not shown. The very high purity ethylbenzene product is removed from fractionator 171 through line 174.

The extract phase is withdrawn from tower 24 through line 41 and is passed through heater 42 in line 43 into decomposer 44. The HF and hydrocarbons are vaporized in decomposer 44 and the vapors pass out through line 47, cooler 48 and line 49 into settler 51. In settler 51 the lower layer of liquid HF is passed through line 91 to line 88.

The hydrocarbons pass out of settler 51 through line 54 and are in part recycled to tower 24 by way of lines 56 and 32; and the remainder is sent through line 57, heater 58 and line 59 through fractionator 61.

In fractionator 61, hexane and some HF is taken overhead through line 63; the vapors are condensed in cooler 64 and are recycled to line 37 by way of line 66 and other lines not shown. The bottoms from fractionator 61 in this operation consist of xylenes and a very small amount of ethylbenzene; this high purity xylene product is withdrawn to storage through line 71.

The solid AgF resulting from the decomposition of the complex is processed in this operation just as it was in the previously described operation.

Thus a very considerable simplification of the process equipment results from operation on a substantially pure C₈ aromatic feed.

Figure 2:
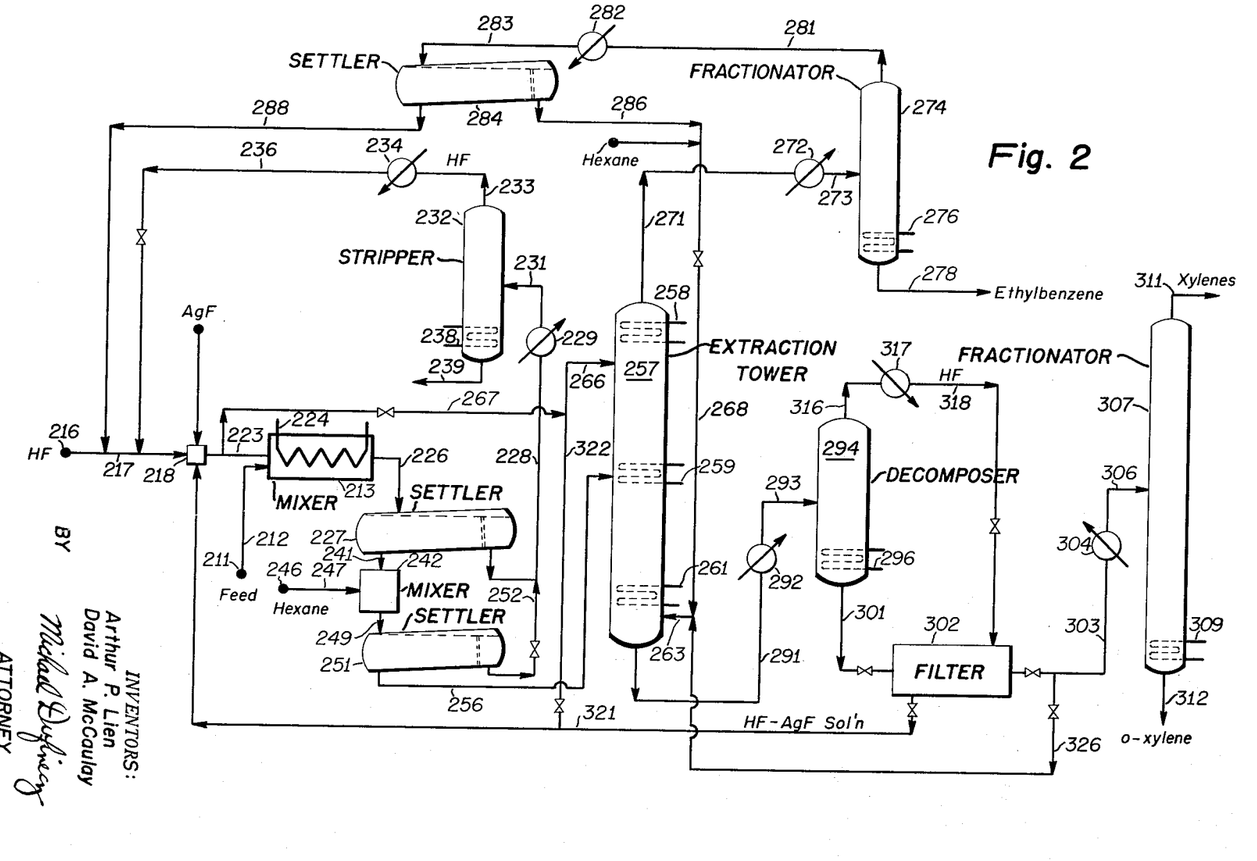
Figure 2 shows the recovery of ethylbenzene and xylenes from a high-sulfur-content virgin naphtha containing substantially no olefins.

In Figure 2, we illustrate another method of utilizing our invention for the recovery of a high purity ethylbenzene product and a high purity xylene product by the treatment of a mixed hydrocarbon feed. In this embodiment we operate on a narrow boiling naphtha obtained from the distillation of West Texas crude. This virgin naphtha usually contains about 0.2 wt. percent sulfur; but no other interfering compounds.

This naphtha is desulfurized to a sulfur content of less than 0.01 wt. percent by treatment with liquid HF. For a detailed description of this liquid HF method of desulfurizing a virgin naphtha, see U. S. 2,450,588.

The desulfurized West Texas naphtha contains about 25% of C₈ aromatics and the ethylbenzene content of the C₈ aromatics is about 40%. This feed does not normally need the addition of a diluent hydrocarbon. The feed is passed from source 211 through line 212 into mixer 213. Liquid HF from source 216 is passed through line 217 into vessel 218. AgF from source 221 is passed by way of line 222 into vessel 218 where it is dissolved by the liquid HF. The liquid HF-AgF treating agent is passed from vessel 218 through line 223 into mixer 213. In this illustration as a first step we wish to remove substantially all the C₈ aromatics from the feed in a single contacting stage. In order to accomplish this, we use 1.1 mols of AgF per mol of C₈ aromatic present in the feed. The liquid HF usage herein is 400 volume percent based on C₈ aromatics in order to increase the selectivity of aromatic extraction.

Mixer 213 is provided with an exchanger 224 which raises the temperature of the contents of the mixer to 80° F.; a pressure of about 25 p. s. i. g. is maintained on the system in order to keep the HF in the liquid state. The treating agent and the feed are contacted in mixer 213 for about 10 minutes. The contents of mixer 213 are passed through line 226 into settler 227.

In settler 227 two phases separate. The upper raffinate phase consists essentially of non-aromatics and some HF; this raffinate phase is passed from settler 227 through line 228, exchanger 229 and line 231 into stripper 232. Stripper 232 is operated in such a way that an overhead of HF and some azeotroped hydrocarbon is removed through line 233. The vapors in line 233 are condensed in cooler 234 and are recycled to line 217 by way of line 236. In some cases the amount of hydrocarbons present in the HF stream may be great enough that a settling type separator may be introduced after cooler 234 before the HF is recycled. (This settling operation is not illustrated here but is similar to that shown in Figure 1.) The temperature in the bottom of stripper 232 is maintained by internal heater 238 at a point high enough to remove substantially all the HF. The HF-free non-aromatics are sent to storage or to further treatment by way of line 239. This non-aromatic fraction is rich in naphthenes and is an excellent feed stock to a hydroforming operation.

The extract phase from settler 227 contains an objectionable amount of close boiling non-aromatics in addition to the aromatic constituents. The extract phase is passed from settler 227 by way of line 241 into mixer 242 where it is contacted with a stream of hexane from source 246 and line 247. The contents of mixer 242 are passed by way of line 249 into settler 251. The upper layer in settler 251 consists of the extract non-aromatics and hexane. This upper layer is passed by way of valved line 252 into line 228 for recovery of the hexane and HF.

The lower layer from settler 251 consists of HF, complex, excess AgF and hexane. The lower layer is passed through line 256 into extraction tower 257, which tower is provided with internal heat exchangers 258, 259 and 261.

In this illustration we show only one extraction tower which should contain about 50 theoretical extraction stages. However, it may be desirable to use two or more towers operated in series instead of one very tall tower. The extraction tower is constructed much like tower 24. In this illustration we operate tower 257 at a temperature of about 80° F. and at a pressure of about 25 p. s. i. g.

In this operation we take advantage of the fact that xylene can displace ethylbenzene from its complex with AgF. Xylenes are introduced into a lower point of tower 257 by way of line 263. Sufficient xylene is added to complex all of the uncomplexed AgF entering the tower through line 256 and also enough to act as a reflux in the tower. The reflux xylenes should be present in a reflux/xylene product ratio of at least 5:1.

A reflux steam of liquid HF-AgF treating agent is introduced near the top of tower 257 through line 266. The amount of AgF in this reflux stream should be just enough to complex with the reflux xylenes introduced through line 263. The treating agent in line 266 may be taken from line 223 by way of valved line 267.

In order to aid in phase separation we add hexane to tower 257 by way of lines 268 and 263. We prefer to use 1 volume of hexane per volume of C₈ aromatics entering tower 257.

A raffinate phase consisting of hexane, ethylbenzene, some xylene and some HF passes out of tower 257 through line 271. The raffinate phase in line 271 is passed through heater 272, line 273 into fractionator 274. Fractionator 274 is provided with an internal heater 276 and a number of fractionating trays sufficient to keep any ethylbenzene from passing overhead with the hexane. The temperature in fractionator 274 is maintained high enough to take overhead all the hexane and the HF in the raffinate phase and to produce a bottoms product of high purity ethylbenzene. The ethylbenzene product passes out of fractionator 274 through line 278 to storage not shown.

Hexane and HF are taken overhead from fractionator 274 through line 281, cooler 282 and line 283 into settler 284. In settler 284 the upper layer of hexane is recycled to extraction tower 257 by way of lines 286 and 268. The bottom layer of liquid HF is recycled from settler 284 to line 217 by way of line 288.

The extract phase from tower 257 consists of HF, complex and some hexane. The extract phase is passed by way of line 291, heater 292 and line 293 into decomposer 294 which is provided with an internal heater 296 and several bubble trays in order to obtain some fractionation. In decomposer 294 the complex is destroyed by boiling off the HF. The top temperature maintained in decomposer 294 is preferably high enough to vaporize all the HF and the hexane, i. e., about 175° F. at atmospheric pressure operation and yet low enough to retain the xylenes in the decomposer. The bottom temperature should be between about 200 and 400° F.

The aromatics and the solid finely divided AgF are present in the bottom of decomposer 294 in the form of a slurry, which slurry is passed out of the decomposer through valved line 301 into filter 302. Filter 302 may be any type of HF-resistant, HF-vapor-tight filter of the plate and frame type, rotary type, etc. We prefer to use a filter of the Sweetland type. The xylenes pass out of filter 302 through valved line 303 through heat exchanger 304 and line 306 into fractionator 307.

Fractionator 307 is provided with a sufficient number of bubble trays to permit the separation of ortho-xylene from the meta and para isomers. The bottom temperature in fractionator 307 is maintained high enough by reboiler 309 to vaporize meta-xylene, para-xylene and ethylbenzene. The high purity meta and para-xylene product, substantially free of ortho-xylene, is taken overhead through line 311 and sent to storage not shown. The bottoms product of high purity ortho-xylene is withdrawn through line 312 to storage not shown.

The HF and hexane vapors pass from decomposer 294 through line 316 and are condensed by cooler 317. The HF-hexane mixture is passed through line 318 into filter 302 where the HF dissolves the AgF retained therein. The liquid HF-AgF solution is recycled from filter 302; a portion thereof passes by way of line 321 to vessel 218; and the other portion is passed through line 321 and valved line 322 to line 266 for use as reflux in tower 257.

A portion of the aromatics from line 303 is passed by way of valved line 326 to line 263 for use as reflux in tower 257.

Although the method of operation shown in Figure 2 requires very much larger amounts of AgF in the system and handling of much larger amount of xylene in the extraction tower, the savings on process equipment may make this type of operation preferable to that described in Figure 1.

In the case of feed stocks containing appreciable amounts of sulfur, the sulfur compound-AgF complex will gradually build up in the system, when operating on a "no aromatic overhead" type of aromatic complex decomposition procedure. Periodically, the AgF and sulfur compound complex can be removed from filter 302 and sent to decomposer 294—in a blocked out operation. The temperature in decomposer 294 is raised to between 400 and 500° F. At this temperature the sulfur compound complex is decomposed and the sulfur compounds together with any remaining HF pass overhead and are condensed and pass out of the system by lines not shown. A new cycle of operation may then be begun by dissolving the AgF in the decomposer with liquid HF.

It is to be understood that the above described embodiments of our invention are submitted by way of example and do not include all the variations which can easily be made by one skilled in the art; such variations will be dependent upon the particular feed stock used and the operating conditions desired.

We have shown two methods of recovery of the solid AgF from the decomposition of the complex. We do not wish to be bound by these methods as the only methods for this recovery. For example, the decomposer can be operated at such a temperature that all of the aromatic product is taken overhead and the hydrocarbons separated from the liquid HF by decantation. The residual AgF in the decomposer is dissolved in liquid HF and the solution recycled. Continuous operation is achieved by intermittent use of two or more external reboiler vessels. Still other methods of recovering the solid AgF can very readily be devised, and we intend to include such methods within the scope of our invention.

We claim:

1. A process which comprises contacting, at a temperature between about 30° F. and 160° F., a feed consisting of C$_8$ aromatic hydrocarbons and containing ethylbenzene and at least one xylene with a treating agent consisting of liquid HF in an amount between 10 and 1500 volume percent, based on feed, and AgF in an amount of between about one-quarter and one-third mole per mole of xylene in said feed, thereby forming an extract phase comprising HF, AgF and hydrocarbons in a mole ratio of xylene to ethylbenzene greater than in said feed and a raffinate phase comprising hydrocarbons in a mole ratio of xylene to ethylbenzene lower than in said feed, separating said phase and recovering hydrocarbons from said phases.

2. The process of claim 1 wherein AgF is present in one-third mole per mole of xylene.

3. A process which comprises countercurrently contacting, at a temperature between about 50° F. and 120° F., a feed consisting of C$_8$ aromatic hydrocarbons and containing ethylbenzene and at least one xylene with a treating agent consisting of liquid HF, in an amount between about 100 and 600 volume percent, based on said feed, and AgF in an amount of about one-third mole per mole of xylene in said feed, withdrawing a raffinate phase comprising hydrocarbons having a mole ratio of xylene to ethylbenzene substantially lower than their ratio in the feed, withdrawing an extract phase comprising liquid agent and hydrocarbons having a mole ratio of xylene to ethylbenzene substantially higher than their ratio in the feed, and separately recovering said hydrocarbons from said raffinate phase and said extract phase.

4. The process of claim 3 wherein a low boiling hydrocarbon inert to the action of HF is introduced into said contacting zone at a point above and near the point of extract phase withdrawal.

5. A process which comprises countercurrently contacting, under conditions to provide about 50 theoretical stages, at a temperature between about 50° F. and 120° F., and for at least about 5 minutes in each stage, a feed consisting of C$_8$ aromatic hydrocarbons and containing ethylbenzene and at least one xylene with a treating agent consisting of liquid HF, in an amount between about 250 and 500 volume percent, based on feed, and one-third mole of AgF per mole of xylene in said feed, to form a raffinate phase and an extract phase, introducing into said zone at a point above and near the point of extract phase withdrawal a low-boiling liquid hydrocarbon, inert to HF, in an amount of about one volume per volume of feed, withdrawing a raffinate phase from the upper part of said contacting zone, withdrawing an extract phase from the lower part of said contacting zone, removing low-boiling hydrocarbon and residual agent from said raffinate phase to obtain a high-purity ethylbenzene product, and removing HF, AgF, dissolved low-boiling hydrocarbon from said extract phase to obtain a high-purity xylene product.

6. A process for the recovery of a high purity ethylbenzene aromatic fraction and a high purity xylene aromatic fraction from a naphtha boiling between about 245° and 300° F. and which contains substantially no organic-sulfur compounds and phenolic compounds, which process comprises (1) contacting said naphtha, at a temperature between about 30 and 100° F., with a treating agent which consists essentially of liquid HF, about 75 to 300 volume percent based on aromatics in said naphtha, and an amount of AgF sufficient to extract substantially all of said aromatics from said naphtha, (2) separating a raffinate phase, consisting essentially of non-aromatics and HF, and an extract phase consisting essentially of treating agent, aromatics and some non-aromatics, (3) washing said extract phase with a liquid HF-inert diluent hydrocarbon to remove substantially all of said non-aromatics, (4) countercurrently contacting said extract phase from (3), at a temperature between about 50 and 120° F., with a treating agent consisting essentially of liquid HF, sufficient to raise the amount in the countercurrent contacting zone to about 250 to 500 volume percent based on aromatics in said extract phase from (3) and about one-third mol of AgF for each mol of xylene reflux added to said countercurrent contacting zone, in the presence of about one volume of liquid HF-inert diluent hydrocarbon per volume of aromatics in said extract phase from (3), and in the presence of sufficient added xylene to complex with the uncomplexed AgF in said extract phase from (3) and in the presence of xylene reflux added in addition to said added xylene, (5) separating a raffinate phase consisting of ethylbenzene, diluent hydrocarbon, some xylene and some HF, from an extract phase consisting of treating agent, xylene, some ethylbenzene and some diluent hydrocarbon, (6) recovering from said raffinate from (5) a high purity ethylbenzene aromatic fraction and (7) recovering from said extract phase from (5) a high purity xylene aromatic fraction.

References Cited in the file of this patent

UNITED STATES PATENTS

| | | |
|---|---|---|
| 2,246,257 | Kohn | June 17, 1941 |
| 2,378,762 | Frey | June 19, 1945 |
| 2,391,404 | Friedman et al. | Dec. 25, 1945 |
| 2,521,444 | Brooke et al. | Sept. 5, 1950 |
| 2,630,406 | Linn | Mar. 3, 1953 |
| 2,639,303 | Linn et al. | May 19, 1953 |

OTHER REFERENCES

J. Am. Chem. Soc., vol. 70, pages 2832–3 (1948), article by Benesi et al.

J. Am. Chem. Soc., vol. 71, pages 3644–7 (1949), article by Andrews et al.

Ind. Eng. Chem., vol. 42, pages 2103–7 (1950), article by McCauley et al.